United States Patent [19]

Bauer et al.

[11] 4,128,931

[45] Dec. 12, 1978

[54] TOOL FOR OPENING CABLE FITTINGS

[75] Inventors: Josef Bauer, Germering; Herbert Krause, Munich; Hans-Juergen Meltsch, Germering, all of Germany

[73] Assignee: Siemens Aktiengesellschaft, Berlin & Munich, Germany

[21] Appl. No.: 818,214

[22] Filed: Jul. 22, 1977

[30] Foreign Application Priority Data

Jul. 29, 1976 [DE] Fed. Rep. of Germany ... 7623935[U]

[51] Int. Cl.$^2$ .............................................. B23P 19/04

[52] U.S. Cl. ......................................... 29/239; 29/257

[58] Field of Search ......................... 29/239, 256, 257; 254/67; 269/271, 283

[56] References Cited

U.S. PATENT DOCUMENTS

| | | | |
|---|---|---|---|
| 1,024,728 | 4/1912 | Jackson | 269/283 |
| 1,120,798 | 12/1914 | Duecker | 29/239 |
| 1,365,559 | 1/1921 | Starks | 29/239 |

FOREIGN PATENT DOCUMENTS

| | | | |
|---|---|---|---|
| 59161 | 12/1953 | France | 269/282 |

*Primary Examiner*—James L. Jones, Jr.
*Attorney, Agent, or Firm*—Hill, Gross, Simpson, Van Santen, Steadman, Chiara & Simpson

[57] ABSTRACT

A clamping tool having a bracket arm with a stationary jaw at one end thereof. The bracket arm supports a movable jaw. Each of the jaws have slot openings with grasping means for use in applying tension clamps to cable members. The tool is modified to enable it to function as a cable fitting opening device through the provision of projections attachable to the jaws which projection can be urged towards one another by movement of the movable jaw to urge the projections into contact with projections or recesses of cable fittings to force the cable fittings to open.

12 Claims, 5 Drawing Figures

TOOL FOR OPENING CABLE FITTINGS

BACKGROUND OF THE INVENTION

1. Field of the Invention

This invention relates to tools and more particularly to tools for opening cable fittings.

2. Prior Art

Cable fitting closing tools are known in the art wherein the tool consists of a bracket member having an elongated base with a upstanding stationary jaw at one end of the base. A movable jaw rides on the base towards and away from the stationary jaw and is movable by means of a screw thread rod received through a threaded bore in an end of the base opposite the stationary jaw. Such tools may have openable jaws and are used as closure devices for longitudinally split or separated cable fittings which are to be closed and maintained in a closed position by means of a tension band passed therearound. In usage such tools are operated by placing the tension band in the stationary jaw with the free end of the tension band clamped into the movable tension jaw. The movable jaw is then moved with respect to the stationary jaw by rotation of the threaded rod. It would be an advance in the art to increase the versatility of such tools by modifying them for other usages.

SUMMARY OF THE INVENTION

This invention therefore has as its principle object to increase the versatility of tools of the type above described such that they can be used for both opening and closing cable fittings.

This objective is accomplished according to this invention in that a tool of the above described type is modified by providing each of the jaws with inserts which have tabs dimensioned to project out of the respective tension jaw in opposition with a tab projecting from the other tension jaw.

The completed opening and closing tool can be economically produced by simply adding parts to the already existing closure tool such that the closure tool can be used to open cable fittings.

The projecting tabs of the added parts which are attached to the tension jaws can be used to contact, for example, protrusions or recesses in the cable fittings in such a manner to open the cable fitting.

In a preferred embodiment illustrated, the additional parts constitute bent metal plates which are receivable in the existing stationary and movable jaws and which include projecting tabs which will be in opposition to one another when the parts are received in the respective jaw.

In a second embodiment, one of the projecting tabs is formed of a bent rod receivable in one of the jaws and the other projecting tab is formed as a rod member receivable in a bore in the second jaw.

It is therefore the object of this invention to modify existing cable fitting closure tools such that the tool, with the addition of two simple parts, can function as a cable fitting opening tool.

Other objects, features and advantages of the invention will be readily apparent from the following description of a preferred embodiment thereof, taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
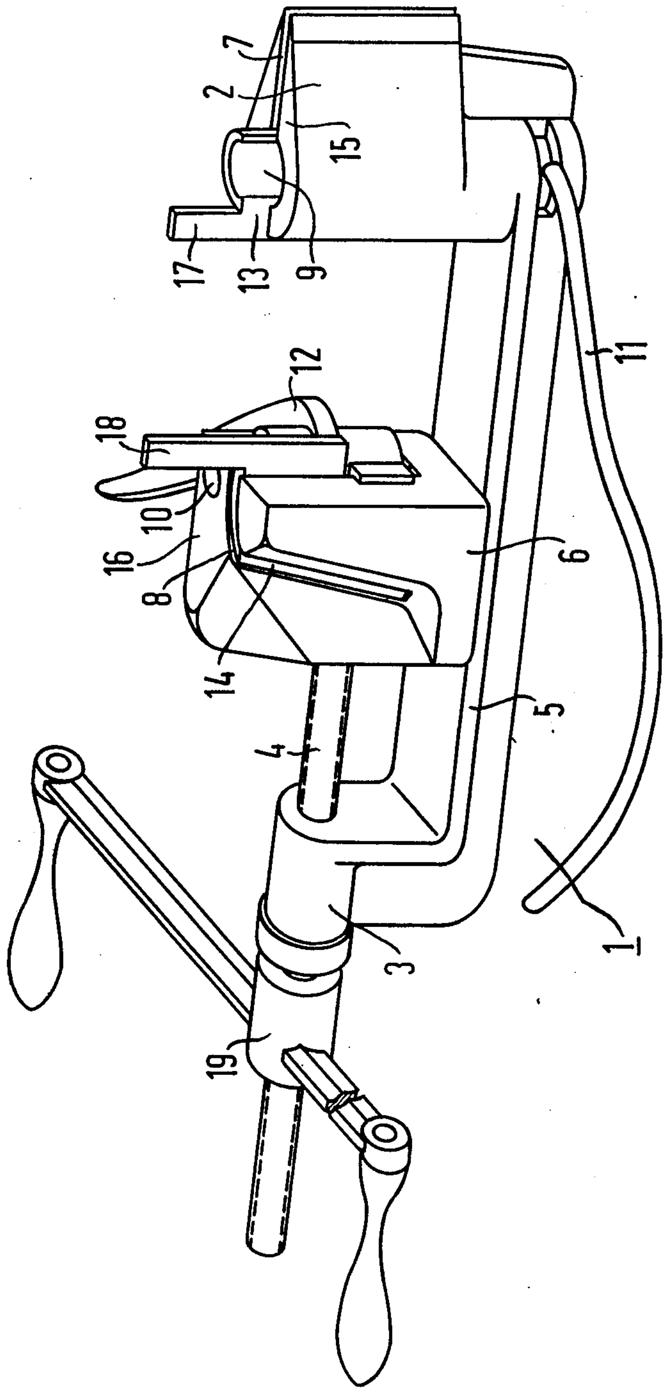
FIG. 1 is a perspective view of a cable fitting closure tool modified according to this invention.

FIG. 1 illustrates, in an elevational perspective view, an existing closing tool modified according to this invention. Such tools are used, for example, to close longitudinally separated cable fittings. The tool consists of a bracket arm member which has a stationary jaw 2 affixed at one end and whose other end forms a support leg 3 having a threaded bore receiving a threaded screw rod 4. One end of the screw rod is affixed to a movable jaw 6 supported on the middle portion of the bracket arm 1. The threaded rod 4 is rotated by means of a hand crank 19.

Each of the jaws 2 and 6 are provided with slits 7 and 8 and drilled holes 9 and 10. Clamping levers 11 and 12 function to clamp tension bands tightly within the jaws 2 and 6 in a known manner in order to effect closure of a cable fitting.

In modifying the tool illustrated in FIG. 1 to allow usage of the tool to open a cable fitting, insert parts 13 and 14 are provided respectively in the stationary jaw 2 and the movable jaw 6.

Figure 2:
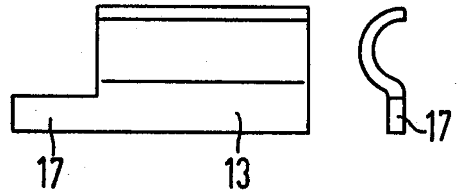
FIG. 2 is a side elevational and an end plan view of one projecting tab part according to this invention.
Figure 3:
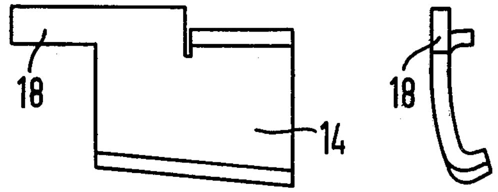
FIG. 3 is a side elevational and an end plan view of a second projecting tab part according to this invention.
Figure 4:
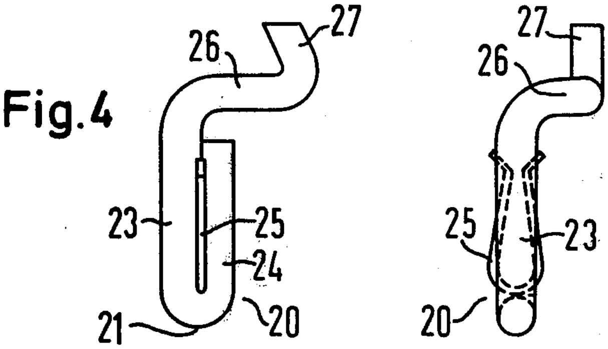
FIG. 4 is a side and an end view of a modified part with a projecting tab according to this invention.
Figure 5:
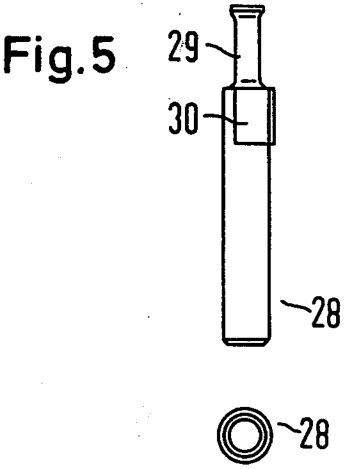
FIG. 5 is a side plan view of a rod projecting tab according to this invention.

As best illustrated in FIGS 2 and 3, the parts are bent plate members having shapes corresponding to the shapes of the slits in the tension jaws such that the part 13 has a curved body portion receivable in the slit 7 in the area of the bore 9 whereas the part 14 has a wider curvature dimensioned to fit into the slot 8 and also has an overlapping front tang projecting from a front face of the slot into opposition or overlap with a front face of the movable jaw. Actuation of the clamping levers 11 and 12 will tightly clamp the parts 13 and 14 within their respective jaws.

The parts 13 and 14 are preferably shaped such that they are insertable into the slits from the top surfaces 15 and 16 of the jaws.

The shaped plates 13 and 14 are each formed with longitudinally extending edge face projecting portions 17 and 18 which form tabs protruding from the opposed faces of the jaws 2 and 6. The protruding tabs 17 and 18 can then be utilized to project into or to contact corresponding cable fitting opening attachments, lugs or recesses. The tool is thus activated by rotation of the hand crank 19 to move the tabs towards one another into contact with the cable fitting opening configuration to push apart the cable fittings. The opening movement path of the tool is preferably on the order of 85 mm. By use of such a tool, cable fittings or sockets of half shell or clam shell constructions, joint sealing members, sockets and similar separatable fittings can easily be opened. The tool is particularly suited for opening clamping sockets made of thermoplastic synthetic material whenever the individual parts of the socket must be partially removed during repairs. In this type of opening a large force application and a large opening path or distance movement are both needed because of the adhesion power of the flowable sealants utilized in association with such sockets.

In place of the shaped plates illustrated in FIG. 2 and 3, FIGS. 4 and 5 illustrate opening protrusion forming parts which are considerably simplier and more economical to manufacture. The parts include an opening hook 20 illustrated in FIG. 4 and a hook opposing pin 28 illustrated in FIG. 5.

The hook part 20 is formed of round bar stock and is provided with two parallel reverse bent legs 23 and 24 interconnected at a bight end 21 in the manner of a substantially closed hairpin bend. These legs are then insertable into the drilled opening in the stationary jaw 2. The bar stock projects from the leg 23 through an offset horizontal leg 26 to a hook end 27 forming a protruding tab extending out of the tension jaw 2. In order to securely anchor the part 20 in the tension jaw, a two legged wire spring member 25 can be clamped between the legs 23 and 24. In place of the wire clamp 25, a clasp can be substituted with the clasp, for example, extending around the tension jaw from the outside thereof, thereby maintaining the part 20 in position in the tension jaw.

The pin 28 may also be formed of round bar stock and is dimensioned to be attached to the movable tension jaw within the drill hole 10 with an upper portion 29 projecting therefrom. When received in the hole 10, the pin 28 can also form the axis for rotation of the clamp lever 12. The end portion 29 forms a tab projecting above the jaw and in opposition to the upwardly and forwardly projecting tab 27 of the part 20. The projecting tab end 29 is preferably of smaller diameter than the remaining portion of the pin 28. The pin is provided with circumferential notches 30, preferably in three spaced areas, the notches assuring fastening of the pin in the hole. In contrast to the shaped plates 2 and 3 which are loosely received in the tension jaws and thereafter held in place by activation of the clamping levers 11 and 12, the pin is pressed fit into drilled opening 10 in such a way that it is firmly affixed to the movable tension jaw. The part 20 is retained in the stationary tension jaw by means of the wire clamp 25 and is removable from the stationary jaw 2 upon application of sufficient force.

It can therefore be seen from the above that our invention provides a modification of pre-existing cable fitting closure tools which modification, although economical and simple, allows increased versatility of the tools in that it provides cable fitting opening capabilities for the tool. The modification consists primarily of the addition of a part to be received in association with each of the movable and stationary jaws of the tool which part includes a projecting member in opposition to the projecting member of the part of the other jaw which projecting members can be urged towards one another and into opening force contact with a cable fitting.

Although the teachings of our invention have herein been discussed with reference to specific theories and embodiments, it is to be understood that these are by way of illustration only and that others may wish to utilize our invention in different designs or applications.

We claim as our invention:

1. A tool for opening cable fittings comprising: a bracket arm, stationary and movable tension jaws at least one of which is a closable clamping jaw, said jaws carried by said bracket arm having top surfaces and a horizontal dimension, an insert member detachably attachable to each of said tension jaws, each insert member provided with a tab means, said tab means projecting beyond a top surface of each of the tension jaws upon attachment of the insert member to its associated tension jaw, the projecting tab means being of smaller horizontal dimension than the jaws and being movable towards and away from one another upon movement of the movable tension jaw towards and away from the stationary tension jaw and being engageable with portions of a cable fitting to force the cable fitting open.

2. A tool according to claim 1 wherein the inserts are formed of bent metal plates having edges, each of said plates having a portion of one edge forming the tab.

3. A tool according to claim 1 wherein the inserts are constructed of circular cross section parts.

4. A tool according to claim 3 wherein one of said inserts is receivable in the stationary tension jaw, said one of said inserts including a tab formed as a hook bent end of the circular cross section part.

5. A device according to claim 4 wherein a second of said inserts is formed as a circular cross section axially extending pin member and is received in a drilled hole in the movable jaw.

6. A device according to claim 1 wherein means are provided for securely attaching the inserts to their associated jaw.

7. The tool of claim 1 wherein each of the tension jaws has a slit extending thereinto, said slit open to a front face of the tension jaw, said slit open to a top face of the tension jaw, at least one of said inserts received in said slit projecting from one of said faces.

8. An opening tool according to claim 1 wherein said tension jaws are provided with drilled holes extending thereinto from a top surface thereof, at least one of said inserts received in one of said drilled holes projecting from the top face of the tension jaw.

9. An opening tool for cable fittings comprising: in combination, a bracket arm having a stationary jaw at a first end thereof and a threaded rod means receiving bore at a second end thereof, a movable jaw carried on the bracket arm and connected to the threaded rod means, rotation of the rod means moving the movable jaw towards and away from the stationary jaw, an insert part for each of said jaws, each of said insert parts being attachable to an associated jaw in a secure position, each insert part having a projecting portion projecting from the associated jaw after secure attachment, the projecting portions of each insert part having at least second portions thereof in opposition to second portions of the other insert part, each of said jaws being provided with drilled holes therein extending thereinto from top faces thereof, the insert part being formed of round bar stock, each of said insert parts being received in a hole and having its projecting portion projecting above a top face of the jaw in which it is received, the jaws having a horizontal dimension, and the projecting portions having a horizontal dimension less than the horizontal dimensions of the jaws, the projecting portions being engageable with portions of the cable fitting to force the cable fitting open.

10. The tool of claim 9, wherein one of said insert parts has a second portion of the projecting portion formed as a bent hook end of said insert part and the other of said insert parts is formed as a pin member, the hook end lying in opposition to projecting portions of the pin member in the direction of movement of the movable jaw.

11. An opening tool for cable fittings comprising: in combination, a bracket arm having a stationary jaw at a first end thereof and a threaded rod means receiving bore at a second end thereof, a movable jaw carried on the bracket arm and connected to the threaded rod means, rotation of the rod means moving the movable jaw towards and away from the stationary jaw, an insert part for each of said jaws, each of said insert parts being attachable to an associated jaw in a secure position, each insert part having a projecting portion projecting from the associated jaw after secure engagement, the projecting portions of each insert part having at least second portions thereof in opposition to second portions of the other insert part, the jaws having a horizontal dimension and a top surface, the second portions projecting above the top surface and having a horizontal dimension less than the horizontal dimension of the associated jaw

12. The tool of claim 11 wherein the projecting edge portions project from the front face and above the top faces of said jaws.

* * * * *